US012752798B2

(12) United States Patent
Schwensfeier et al.

(10) Patent No.: US 12,752,798 B2
(45) Date of Patent: Oct. 6, 2026

(54) ENTERTAINMENT METHOD FOR OPERATING A VEHICLE

(71) Applicant: AUDI AG, Ingolstadt (DE)

(72) Inventors: Florian Schwensfeier, Oberhausen an der Donau (DE); Christina Böhmer, Kasing (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 18/835,664

(22) PCT Filed: Feb. 14, 2023

(86) PCT No.: PCT/EP2023/053665
§ 371 (c)(1),
(2) Date: Aug. 2, 2024

(87) PCT Pub. No.: WO2023/156405
PCT Pub. Date: Aug. 24, 2023

(65) Prior Publication Data
US 2025/0136125 A1 May 1, 2025

(30) Foreign Application Priority Data
Feb. 18, 2022 (DE) ..................... 10 2022 103 883.1

(51) Int. Cl.
*B60W 50/00* (2006.01)
*B60K 35/28* (2024.01)
(Continued)

(52) U.S. Cl.
CPC ......... *B60W 50/0098* (2013.01); *B60K 35/28* (2024.01); *B60W 40/08* (2013.01);
(Continued)

(58) Field of Classification Search
None
See application file for complete search history.

(56) References Cited

U.S. PATENT DOCUMENTS 10,755,691 B1 * 8/2020 Herman ........... G10K 11/17853
11,385,070 B2 * 7/2022 Watanabe .......... G01C 21/3611
(Continued)

FOREIGN PATENT DOCUMENTS

DE 102014224120 A1 6/2016
DE 102015204287 A1 9/2016
(Continued)

OTHER PUBLICATIONS

International Search Report and Written Opinion directed to related International Application No. PCT/EP2023/053665, with English-language translation attached, mailed Jul. 5, 2023; 20 pages.

*Primary Examiner* — Todd Melton
(74) *Attorney, Agent, or Firm* — Sterne, Kessler, Goldstein & Fox P.L.L.C.

(57) ABSTRACT

A method for operating a vehicle, wherein a controller of a vehicle determines a travel parameter for the travel of the vehicle and operates the vehicle during travel with the determined parameter value and an infotainment system of the vehicle provides for a passenger of the vehicle during travel an entertainment content selected by the passenger. The present disclosure also relates to a system for operating a vehicle.

16 Claims, 1 Drawing Sheet

(51) Int. Cl.

| | |
|---|---|
| ***B60W 40/08*** | (2012.01) |
| ***B60W 50/14*** | (2020.01) |
| ***B60W 60/00*** | (2020.01) |

(52) U.S. Cl.

CPC ...... *B60W 50/14* (2013.01); *B60W 60/00136* (2020.02); *B60K 2360/164* (2024.01); *B60K 2360/1868* (2024.01); *B60W 2050/0083* (2013.01); *B60W 2540/215* (2020.02); *B60W 2540/221* (2020.02)

(56) References Cited

U.S. PATENT DOCUMENTS

| | | | | |
|---|---|---|---|---|
| 11,597,340 | B2 * | 3/2023 | Vardharajan ......... | G05D 1/0088 |
| 2019/0016344 | A1 * | 1/2019 | Ehmann ............ | B60W 50/0098 |

FOREIGN PATENT DOCUMENTS

| | | | | |
|---|---|---|---|---|
| DE | 102015014652 | A1 | 5/2017 | |
| DE | 102018212649 | A1 | 1/2020 | |
| DE | 102018221987 | A1 | 6/2020 | |
| DE | 102019201587 | A1 | 8/2020 | |
| EP | 3799941 | A1 | 4/2021 | |
| WO | WO-2019210986 | A1 * | 11/2019 | ............. A63F 13/65 |

* cited by examiner

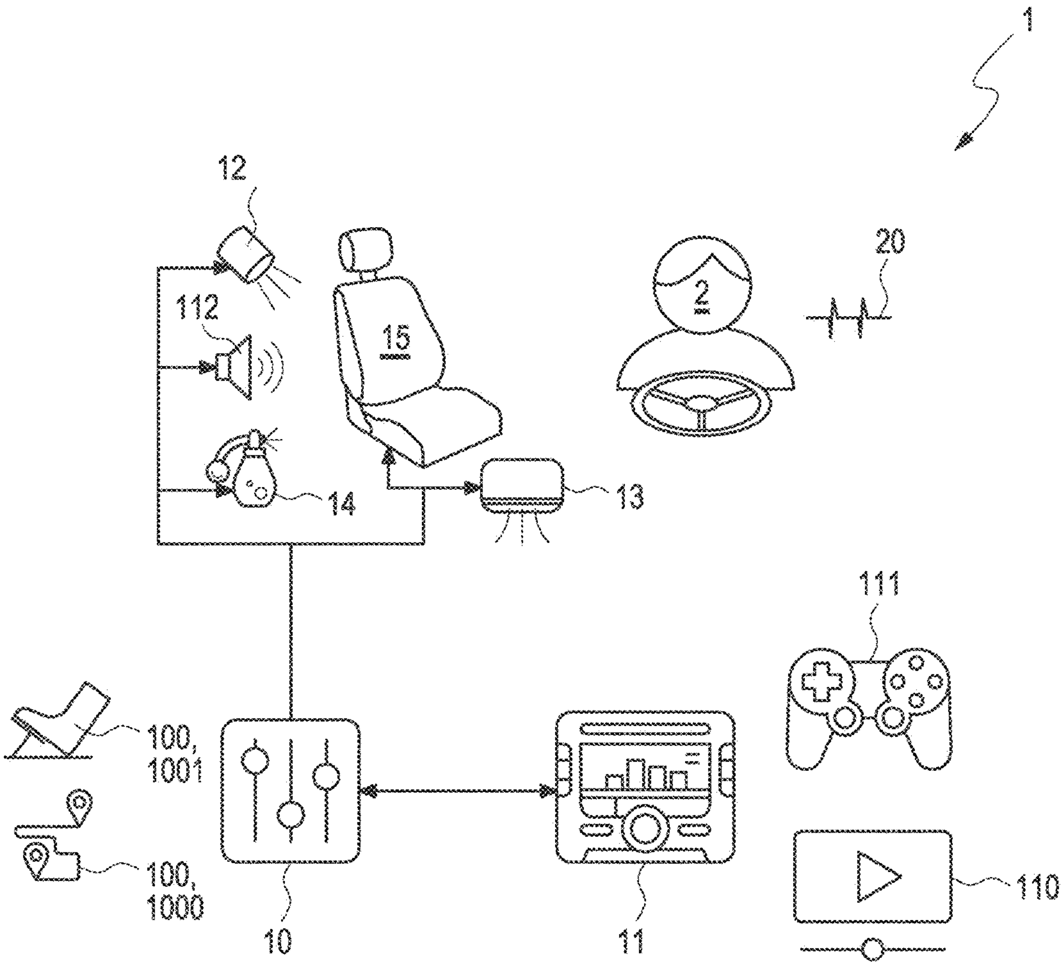
1
12
112
14
15
2
20
13
111
100,
1001
100,
1000
10
11
110

ENTERTAINMENT METHOD FOR OPERATING A VEHICLE

TECHNICAL FIELD

The present disclosure relates to a method for operating a vehicle, in which a control device of a vehicle determines, for a trip of the vehicle, a parameter value of the trip, and operates the vehicle with the determined parameter value during the trip, and an infotainment system of the vehicle provides an occupant of the vehicle with an entertainment content selected by the occupant during the trip. The present disclosure also relates to a system for operating a vehicle.

BACKGROUND

Methods of the type mentioned above form part of the prior art in different embodiments, and are used to entertain an occupant of the vehicle during a trip of the vehicle. The occupant can be a driver, a front passenger, or another passenger. An infotainment system of the vehicle provides a variety of different entertainment content for entertaining the occupant. Examples of entertainment content are videos, video games, music, or audiobooks. The occupant can select an item of entertainment content for the vehicle trip.

During a trip in a closed vehicle, the occupant is normally largely cut off from the vehicle's surroundings environment in sensory terms, which limits the occupant's experience during the trip.

To remedy this, DE 10 2019 201 587 A1 proposes an operating method for a vehicle, in which a fragrance device of the vehicle provides a fragrance for an interior of the vehicle depending on a sensor-detected environment of the vehicle and/or a position of the vehicle.

Apart from this, a long trip can make the occupants of the vehicle feel unenthusiastic before the trip begins, and bored during the trip.

EP 3 799 941 A1 aims to counteract such bad moods of the occupant and discloses an operating method for a vehicle in which a trip of the vehicle itself provides entertainment to the occupants of the vehicle. Specifically, the trip can depend on a solution found by an occupant to a task set for the occupant or can solve a task set for the occupant.

DE 10 2018 221 987 A1 also discloses an operating method for a vehicle that is intended to improve the mood of an occupant during a trip of the vehicle. Here an infotainment system unlocks hidden entertainment content for the vehicle occupant depending on a particular prior manner of use of the vehicle.

An increasing number of vehicles allow autonomous driving or partially autonomous driving. During an autonomous or partially autonomous trip, the driver of the vehicle is completely or partially relieved of the task of steering the vehicle and can concentrate on entertainment content, as can the front passenger or other passengers.

Accordingly, the occupant can also select a so-called immersive entertainment content for an autonomous trip of the vehicle, i.e., an entertainment content that provides the occupant with a particularly intense experience and is intended to distract the occupant from a current driving situation of the vehicle. However, the experience of the entertainment content can be impaired by the unavoidable acceleration of the vehicle during the trip.

It is therefore a task of the present disclosure to propose a method for operating a vehicle which improves an experience of immersive entertainment content during a trip of the vehicle.

BRIEF DESCRIPTION OF THE DRAWINGS/FIGURES

The present disclosure is schematically illustrated in the drawings on the basis of one embodiment and described further with reference to the drawings.

FIG. 1 shows a block diagram of a vehicle with a system according to an embodiment of the present disclosure for operating the vehicle.

DETAILED DESCRIPTION

The present disclosure relates to the subject matter of a method for operating a vehicle, in which a control device of a vehicle determines, for a trip of the vehicle, a parameter value of the trip, and operates the vehicle with the determined parameter value during the trip, and an infotainment system of the vehicle provides an occupant of the vehicle with an entertainment content selected by the occupant during the trip. Within the meaning of the present disclosure, the parameter value is to be understood as any variable setting of the vehicle which influences a trip of the vehicle and/or an occupant of the vehicle. The providing includes playing the entertainment content during the trip.

In particular, the parameter value can have a structure and can comprise a plurality of data, i.e., the parameter value is not limited to a single numerical value. The vehicle can be designed to set the parameter value automatically or to allow the occupant to selectively set the parameter value.

According to the present disclosure, the control device determines the parameter value depending on the selected entertainment content. The occupant selects the entertainment content for the vehicle trip and the control device adapts the vehicle parameter value to the selected entertainment content. In this way, by selecting the entertainment content, the occupant indirectly determines at least one characteristic of the trip of the vehicle in such a way that the ride supports the experience of the entertainment content, i.e., enhances the immersiveness of the entertainment content. Of course, the vehicle can initially suggest the parameter value determined by the control device to the occupant and only set it after the occupant has accepted it.

Preferably, the control device determines a route for the trip as the parameter value of the trip and drives the vehicle on the determined route and/or the control device determines a driving style for the trip as the parameter value of the trip and drives the vehicle with the determined driving style. The vehicle can arrive at a destination of the trip selected by the occupant as usual along a plurality of alternative routes, i.e., driving routes, which differ with respect to a characteristic of the route, i.e., with respect to an elevation profile, a curvature, a traffic density, and the like. From the plurality of alternative routes, the control device selects the route that best suits the selected entertainment content.

The vehicle provides a number of driving styles, each of which is defined by a driving profile, i.e., a number of driving parameter values of the vehicle. For example, the vehicle can provide a dynamic driving style, which includes a high driving speed and/or strong longitudinal acceleration and lateral acceleration of the vehicle, or an economical driving style, which includes a low driving speed and/or weak longitudinal acceleration and/or lateral acceleration. Of course, the vehicle can provide a number of other driving styles.

As a result, the control device selects the route and/or driving style to match the selected entertainment content.

The control device can also select the route and/or driving style to match the duration of the selected entertainment content, i.e., adapt the duration of the trip to the duration of the selected entertainment content.

In further embodiments, the control device for the trip can adjust an interior light of the vehicle and/or an air conditioning system of the vehicle and/or a fragrance generator of the vehicle depending on the selected entertainment content. The settings of the interior light, the air conditioning, or the fragrance generator are parameter values that affect the occupant during the trip and not the driving of the vehicle itself. The parameter values mentioned can enhance the immersiveness of the selected entertainment content.

Advantageously, the control device determines a position and/or a massage function of a seat of the vehicle for the trip depending on the selected entertainment content. The position and massage function of the seat influence the occupant during the trip and not the driving of the vehicle itself, and can further enhance the immersiveness of the selected entertainment content.

The infotainment system can also provide a soundscape for the trip depending on the selected entertainment content. The soundscape can complement a selected entertainment content that has no audio component and can enhance the immersiveness of the selected entertainment content by means of a sound accompaniment.

Conveniently, the control device determines the parameter value from a plurality of alternative parameter values using metadata assigned to the selected entertainment content. The metadata assigned to the selected entertainment content categorize the selected entertainment content and/or describe properties of the selected entertainment content. If the selected entertainment content is a video or video game, it may belong to a category such as action, horror, or nature. Or, for example, it can have short or long edits or calm or agitated camera work. The control device determines the alternative parameter values and the metadata of the corresponding alternative trips for the determined alternative parameter values.

For example, the route can predominantly include highways and have the metadata "fast and with few curves" or can predominantly include country roads and have the metadata "slow and with many curves." Accordingly, for a selected entertainment content in the "nature" category the control device can determine the route predominantly having highways and/or the economical driving style, and for a selected entertainment content in the "action" category can determine the route predominantly having country roads and/or the dynamic driving style.

In a further embodiment, the infotainment system adapts the selected entertainment content to a driving situation of the vehicle during the trip. The selected entertainment content can be manipulated in real time. Such entertainment content is referred to as elastic. For example, the control device can determine the manner of movement of an avatar or the sensitivity of a video game control element depending on the specific route and/or driving style.

Therefore, the parameter value determined by the control device depending on the selected entertainment content influences the selected entertainment content, which corresponds to a feedback or reflexive action of the method.

In advantageous embodiments, the control device stores a first assignment of the selected entertainment content to the determined parameter value and/or the vehicle detects a vital parameter value of the occupant of the vehicle during the trip and the control device stores a second assignment of the selected entertainment content to the detected vital parameter value. The stored first assignment forms a memory of the control device for matching pairs of entertainment content and parameter values.

A pulse rate, blood pressure, respiratory rate, body temperature, and skin resistance are examples of vital parameter values that are detected by known sensors. The stored second assignment indicates an actual effect of the selected entertainment content on the occupant and thus a strength of the immersiveness of the selected entertainment content realized by means of the method. The stored second assignment can be useful for manufacturers of vehicles or producers of entertainment content in order to improve the vehicles or entertainment contents.

In particular, for a further trip of the vehicle the control device of the vehicle can determine a parameter value of the further trip and can operate the vehicle with the determined parameter value during the further trip, and the infotainment system can provide the occupant with further entertainment content similar to the selected entertainment content during the further trip, depending on the stored first assignment. The occupant can select the parameter value determined by the control device for the further trip. Conversely, the stored first assignment enables the infotainment system to determine, for the selected parameter value, the further entertainment content similar to the entertainment content included by the stored first assignment and, in particular, to avoid repeating the selected entertainment content or to enable the selected entertainment content to be continued as further entertainment content.

Of course, the infotainment system can first suggest further entertainment content to the occupant and provide it only after the occupant has accepted it.

For example, the vehicle often drives along the same route with the same driving style. The infotainment system then provides the occupants with different but similar entertainment content that matches the route and driving style.

Another object of the present disclosure is a system for operating a vehicle, which comprises a control device and an infotainment system functionally connected to the control device. The control device is designed to determine a driving parameter of a trip of the vehicle. The infotainment system is designed to provide an occupant of the vehicle with entertainment content during a trip of the vehicle.

According to the present disclosure, the system is configured to operate the vehicle in a method according to an embodiment of the present disclosure. The system improves the experience of immersive entertainment content during the trip of the vehicle.

A significant advantage of the method according to the present disclosure is that the immersiveness of an entertainment content is enhanced during a trip of the vehicle. As a result, the experience of the immersive entertainment content by an occupant of the vehicle is improved. This allows the occupant to enjoy in particular long trips of the vehicle.

FIG. 1 shows a block diagram of a vehicle 1 with a system according to an embodiment of the present disclosure for operating the vehicle 1. The system for operating the vehicle 1 comprises a control device 10 and an infotainment system 11 functionally connected to the control device 10.

The system can further comprise an interior light 12, an air conditioning system 13, a fragrance generator 14, and a seat 15.

The system is configured to operate the vehicle 1 in a method according to an embodiment of the present disclosure for operating a vehicle 1 as follows.

During a trip of the vehicle 1, the infotainment system 11 of the vehicle 1 provides an occupant 2 of the vehicle 1 with an entertainment content 110 which an occupant 2 of the vehicle 1 has selected for the trip. The infotainment system 11 can adapt the selected entertainment content 110 to a driving situation of the vehicle 1 during the trip.

The control device 10 determines, for the trip of the vehicle 1, a parameter value 100 depending on the selected entertainment content 110, and operates the vehicle 1 with the determined parameter value 100 during the trip. Preferably, the control device 10 determines the parameter value 100 from a plurality of alternative parameter values 100 based on metadata associated with the selected entertainment content 110.

For example, the control device 10 determines a route 1000 for the trip as the parameter value 100 of the trip and drives the vehicle 1 on the determined route 1000. Alternatively or additionally, the control device 1 can determine a driving style 1001 for the trip as the parameter value 100 of the trip and the vehicle drives with the determined driving style 1001.

Furthermore, the control device 10 can adjust the interior light 12 of the vehicle 1 and/or the air conditioning system 13 of the vehicle 1 and/or the fragrance generator 14 of the vehicle 1 for the trip, depending on the selected entertainment content 110.

Alternatively or additionally, the control device 10 can determine a position and/or a massage function of the seat 15 of the vehicle 1 for the trip depending on the selected entertainment content 110.

Apart from this, the infotainment system 11 can provide a soundscape 112 for the trip depending on the selected entertainment content 110.

The control device 10 can store a first assignment of the selected entertainment content 110 to the particular parameter value 100. The vehicle 1 can also detect a vital parameter value 20 of the occupant 2 of the vehicle 1 by sensors during the trip. The control device 10 can store a second assignment of the selected entertainment content 110 to the recorded vital parameter value 20.

This also makes it possible for the control device 10 of the vehicle 1 to determine, for a further trip of the vehicle 1, a parameter value 100 of the trip after a selection by the occupant 1 and to operate the vehicle 1 with the determined parameter value 100 during the further trip. The infotainment system 11 can then provide the occupant 2 with further entertainment content 111 similar to the selected entertainment content 110 during the rest of the trip, depending on the stored first assignment.

LIST OF REFERENCE NUMBERS

1 Vehicle
10 Control device
100 Parameter value
1000 Driving route
1001 Driving style
11 Infotainment system
110 Entertainment content
111 Further entertainment content
112 Soundscape
12 Interior light
13 Air conditioning
14 Fragrance generator
15 Seat
2 Occupant
20 Vital parameter value

The invention claimed is:

1. A method of operating a vehicle comprising:

providing, by an infotainment system of the vehicle, entertainment content to an occupant of the vehicle, wherein the entertainment content is selected by the occupant;

determining, by a control device, a parameter value for a trip of the vehicle, wherein the parameter value is determined based on the entertainment content, and wherein the parameter value comprises a driving style for the trip; and operating the vehicle with the parameter value during the trip.

2. The method according to claim 1, further comprising:

determining, as the parameter value of the trip, a driving route for the trip; and driving the vehicle on the driving route.

3. The method according to claim 1, further comprising:

determining, one or more of a driving speed, a longitudinal acceleration, or a lateral acceleration as the driving style for the trip.

4. The method according to claim 1, further comprising:

adjusting by the control device, at least one of an interior light of the vehicle, an air conditioning system of the vehicle, or a fragrance generator of the vehicle for the trip based on the entertainment content.

5. The method according to claim 1, further comprising:

determining, by the control device, a position and/or a massage function of a seat of the vehicle for the trip based on the entertainment content.

6. The method according of claim 1 further comprising:

providing, by the infotainment system, a soundscape for the trip based on the entertainment content.

7. The method according to claim 1, further comprising:

determining by the control device, the parameter value from a plurality of alternative parameter values based on metadata associated with the entertainment content.

8. The method according to claim 1, further comprising:

adapting, by the infotainment system, the entertainment content to a driving situation of the vehicle during the trip.

9. The method according to claim 1, further comprising:

determining, by the control device, for a further trip of the vehicle, a further parameter value for a further trip of the vehicle and operating the vehicle during the further trip with the further parameter value; and providing, by the infotainment system, a further entertainment content similar to the entertainment content for the occupant during the further trip depending on a stored first assignment.

10. The method according to claim 1, further comprising:

storing, by the control device, a first assignment of the entertainment content to the parameter value;

detecting, by a sensor, a physiological health metric of the occupant; and storing, by the control device, a second assignment of the entertainment content to the physiological health metric.

11. The method of claim 10, wherein detecting, by the sensor, the physiological health metric of the occupant comprises detecting one or more of pulse rate, blood pressure, respiratory rate, or skin resistance of the occupant.

12. A system for operating a vehicle, comprising:

an infotainment system configured to provide entertainment content to an occupant of the vehicle, wherein the entertainment content is selected by the occupant; and a control device configured to:

determine a parameter value for a trip of the vehicle, wherein the parameter value is determined based on the entertainment content, and wherein the parameter value comprises a driving style for the trip; and operate the vehicle with the parameter value during the trip.

13. The system of claim 12, further comprising sensors configured to detect a physiological health metric of the occupant.

14. The system of claim 13, wherein the control device is further configured to:

store a first assignment of the entertainment content to the parameter value; and store a second assignment of the entertainment content to the physiological health metric.

15. The system of claim 13, wherein the physiological health metric of the occupant comprises one or more of pulse rate, blood pressure, respiratory rate, or skin resistance of the occupant.

16. The system of claim 12, wherein the driving style comprises one or more of a driving speed, a longitudinal acceleration, or a lateral acceleration.

* * * * *